United States Patent
Bennett, Jr.

[11] Patent Number: 6,019,408
[45] Date of Patent: Feb. 1, 2000

[54] SAFETY LOCK FOR GRAB HOOK

[76] Inventor: Tom Bennett, Jr., Route 1, Box 100, Richland Springs, Tex. 76871

[21] Appl. No.: 09/048,226

[22] Filed: Mar. 26, 1998

[51] Int. Cl.⁷ ...................................................... B66C 1/36
[52] U.S. Cl. ...................... 294/82.17; 24/599.2; 24/600.9
[58] Field of Search .............................. 294/82.17–82.23; 24/598.7, 599.1–599.9, 600.9, 601.1, 601.2, 601.4; 59/85, 86, 89, 90, 93

[56] References Cited

U.S. PATENT DOCUMENTS

| | | | |
|---|---|---|---|
| 234,716 | 11/1880 | Moulton | 24/600.9 |
| 628,619 | 7/1899 | Alwood | 24/599.9 X |
| 682,685 | 9/1901 | Hakemeyer | 24/599.9 |
| 832,149 | 10/1906 | McKinney | 24/600.9 X |
| 1,519,442 | 12/1924 | Deeter | 24/599.9 |
| 1,769,512 | 7/1930 | Hill | 24/600.9 |
| 3,501,817 | 3/1970 | Bambenek et al. | 294/82.19 |
| 4,464,813 | 8/1984 | Bakker et al. | 24/601.2 X |
| 5,127,219 | 7/1992 | Herron et al. | 294/82.17 X |

FOREIGN PATENT DOCUMENTS

| | | | |
|---|---|---|---|
| 1014455 | 8/1952 | France | 294/82.17 |

*Primary Examiner*—Johnny D. Cherry
*Attorney, Agent, or Firm*—Parkhurst & Wendel, L.L.P

[57] ABSTRACT

An improved safety lock allowing for locking of a chain on a grab hook. The safety lock includes a spring-lock that substantially closes the throat of a grab hook. The spring-lock has a recess that is in axial alignment with a clevis portion of the hook, with a clevis pin retaining them. The spring-lock also includes laterally flared sides to permit quick release by thumb-pressure and rotation by one-quarter turn to open the throat. In one embodiment, the clevis pin has an L-bend and is used to substantially close the throat of the grab hook. The spring hook has flared edges and is placed at the back side of the hook to allow for thumb-pressure to rotate the spring-lock, and the attached clevis pin, one-quarter to open the throat of the hook. A coil spring may be attached between the cotter pin used to restrain the clevis pin and the spring-lock. The safety lock can be used with existing hooks.

7 Claims, 3 Drawing Sheets

FIG. 1A
FIG. 1B
FIG. 1C
FIG. 1D
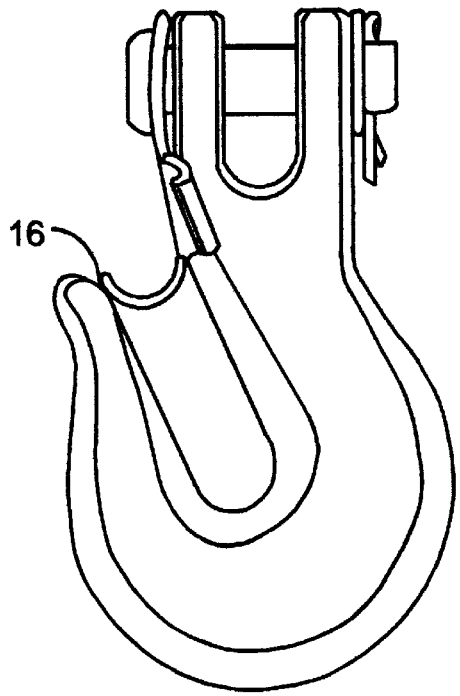
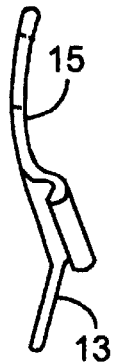
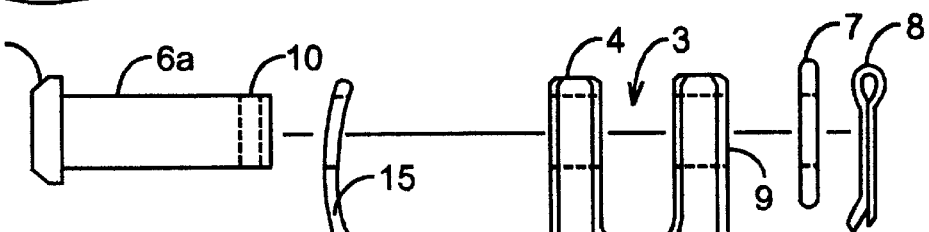
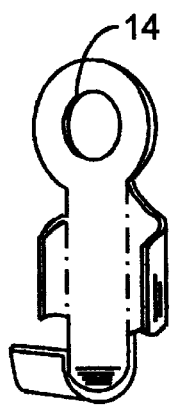

SAFETY LOCK FOR GRAB HOOK

FIELD OF THE INVENTION

This invention relates to hooks that are generally used for towing, lifting and restraining loads. In particular, the invention relates to an improved safety lock for a grab hook and its ability to prevent a chain from slipping out of the grab hook's throat.

BACKGROUND OF THE INVENTION

Hook and chain assemblies are well known for their use in lifting, towing, and/or restraining cargo, often particularly of heavy weight. It is well known in the art that hook and chain assemblies include a throat that will accept one link from the chain. Various techniques have been proposed to prevent the sliding of the chain through the throat that would cause the cargo to fall at a great risk of injury or death to the workers, and damage to the cargo. The present applicant, in U.S. Pat. No. 5,362,117, found one way to solve the problem by devising a hook with a retractable, spring-loaded lock pin that retains the chain link placed in the throat. This spring-loaded lock-pin included a hook body having a throat; a lock-pin having a link retainer located within a hole produced in the hook body; a spring retainer extending from the link retainer; a biasing mechanism for biasing the lock-pin in a retracted position in the hole and locking means including a roll pin to lock positively the lock-pin in a retaining position.

The applicant's previous invention works reasonably well as an effective, yet inexpensive, design to provide a safety lock for a grab hook. The applicant has discovered that, although the previously patented apparatus is effective, there are nonetheless some drawbacks. The spring retainer may lose tension from repeated use. The lock pin and/or roll pin can be damaged. More importantly, the recess hole in the hook body reduces the usable portion of the U-shaped throat, limiting the range of the diameter of chain links that can be utilized. This recess hole in the hook can weaken its structure, and requires an additional step of manufacture. The locking mechanism is not easily adapted to be used with existing grab hooks already on the market. The locking/unlocking means can also be cumbersome to lock and unlock and may not be performed on either side of the hook.

It is therefore an object of the present invention to overcome all of the above-mentioned disadvantages of prior art locks for grab hooks.

SUMMARY OF THE INVENTION

The invention provides a quick releasing safety locking device that can be unlocked with simple thumb-pressure from either side of the hook. The safety lock requires no special drilling through the center of the grab hook and the safety lock can be used with existing grab hooks. In one embodiment, a clevis pin is inserted into the clevis formed at the back side of the clevis of the grab hook. A steel spring-lock has a recess in axial alignment with the clevis pin and the diameter of the recess is large enough to allow passage of the clevis pin. The steel spring-lock is positioned in front of the clevis so that it closes the throat of the grab hook. The spring-lock also has laterally flared edges facing toward the head of the clevis pin so that thumb-pressure on either flared side quickly releases the locking mechanism, by rotating the spring-lock one-quarter turn around the clevis pin to release the chain. A cotter pin or similar mechanism placed through a bore in the end of the clevis pin restrains the motion of the clevis pin.

In a second embodiment, the clevis pin has an L-bend that serves to substantially close the opening of the throat. A spring-lock, having laterally flared edges that face retaining means, is placed at the back side of the clevis of the hook. In this embodiment, the spring-lock has a slotted recess to receive and turn the clevis pin allowing release of the chain link.

In yet another embodiment, a coil spring is placed between the spring-lock and cotter pin, to retain the lock against the back side of the back portion of the hook. The spring-lock has flared edges facing toward the back side of the clevis of the hook. The coil spring is released by pulling the spring-lock away from the hook with a thumb and index finger, and rotating one-quarter turn to cause the clevis pin to turn the same amount and open the throat of the hook.

BRIEF DESCRIPTION OF THE DRAWINGS

FIG. 1A is a side view of the improved safety lock closing a grab hook.

FIG. 1B is an alternative embodiment of the spring steel lock of the safety lock.

FIG. 1C is an exploded view of the safety lock in axial alignment with the recesses of the clevis portion of the grab hook.

DETAILED DESCRIPTION OF THE PREFERRED EMBODIMENTS

Figure 2A:
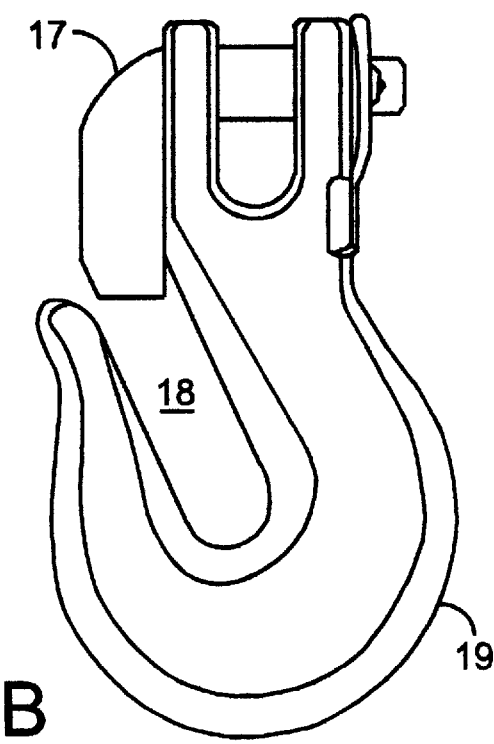
FIG. 2A is a side view of the improved safety lock according to a further embodiment of the invention.

FIG. 1A depicts the safety lock being used to close a grab hook. Grab hook 1 has a U-shaped clevis portion 3 having two bores 4 in axial alignment from the front of the hook to the back. The bores are sized sufficiently so that a clevis pin 6a is receivable by the bores 4. In this embodiment a spring-lock 5 has a recess 14 that receives the clevis pin 6a prior to its entering into the bores 4 of the clevis portion 3. A washer 7 is flush with the back portion 9 of the grab hook. The clevis pin 6a is received by the washer 7. The clevis pin 6a contains a bore 10 perpendicular to its own shank so that cotter pin 8 can be placed therethrough to retain the clevis pin 6a in hook 1. The spring-lock has a curved portion 11 which substantially closes the throat 2 of the hook 1.

An alternative spring-lock, shown in FIG. 1C, has a closing portion 13 that is not curved but positioned at an obtuse angle to substantially close the throat of the hook. In this embodiment the closing portion 13 abuts against the spring catch 16 portion of the hook. Laterally flared edges 12 (see FIG. 1B) on either side of the spring-lock 5 face toward the head 6b of the clevis pin to allow for quick release by thumb-pressure. The jaw portion 15 of the hook is contoured so that it is narrower at the spring catch 16 portion and increasingly widens to accommodate various size chain links. The spring-lock can be pushed at either side by thumb-pressure that causes a one-quarter rotation in relation to the spring catch 16 portion of hook 1. A chain link can then be placed on or removed from the grab hook.

Figure 2B:
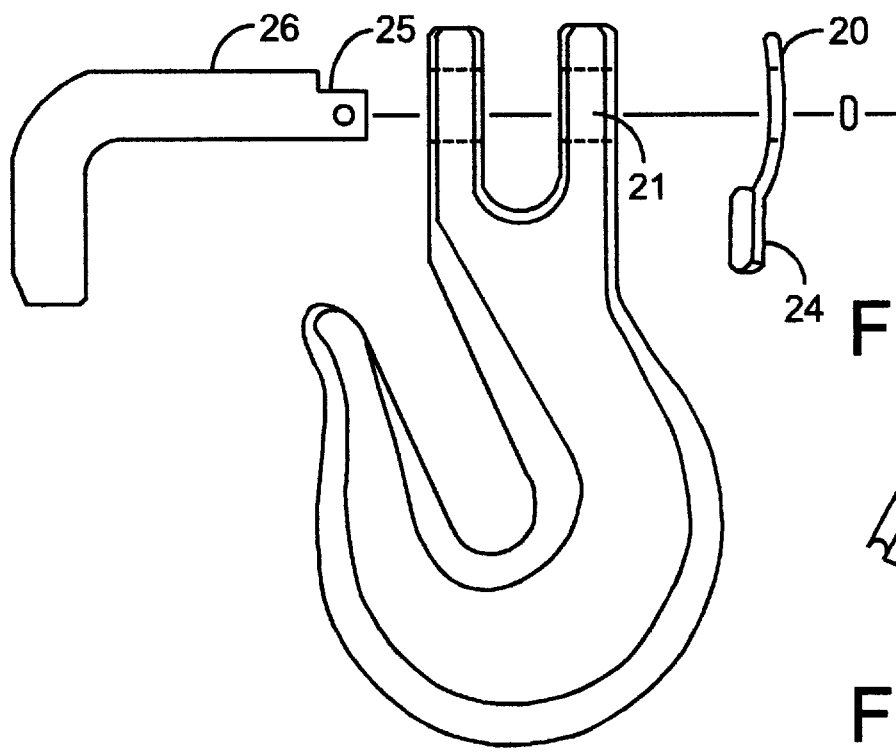
FIG. 2B is an exploded view of the embodiment of FIG. 2A.
Figure 2C:
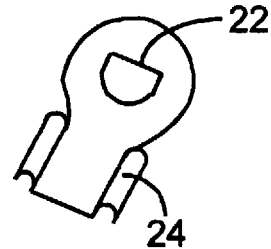
Figure 2D:

The embodiment depicted in FIGS. 2A-2B uses a clevis pin 17 having an L-bend that serves to substantially close the throat 18 of the hook. This embodiment does not utilize a washer, but instead places spring-lock 20 to abut the back portion of the hook 19. The spring-lock has a slot to receive and turn the clevis pin 17. A cotter pin 23 retains the clevis pin through the recess 22 of the spring-lock 20. Flared lateral sides 24, facing the retaining means, allow for thumb-pressure at either side to push the spring-lock, which via the slotted recess 22 rotates the clevis pin and opens the throat 18 of the hook 19.

Figure 3A:
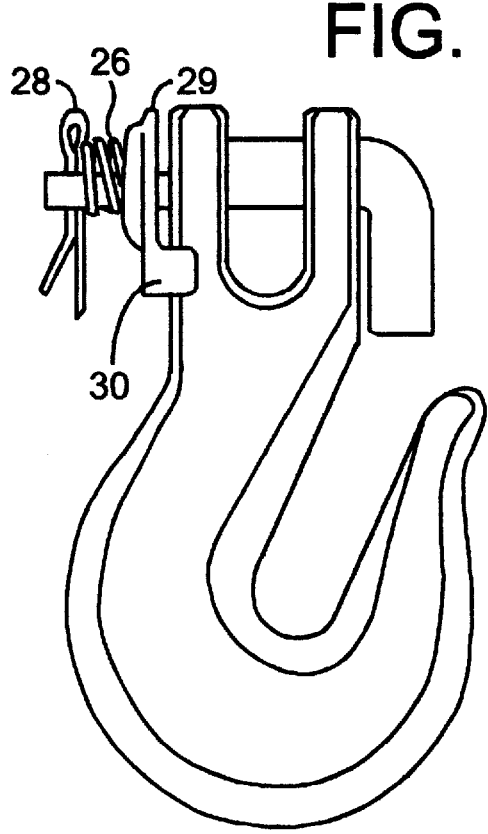
FIG. 3A is a side view of the improved safety lock according to yet another embodiment of the invention.
Figure 3B:
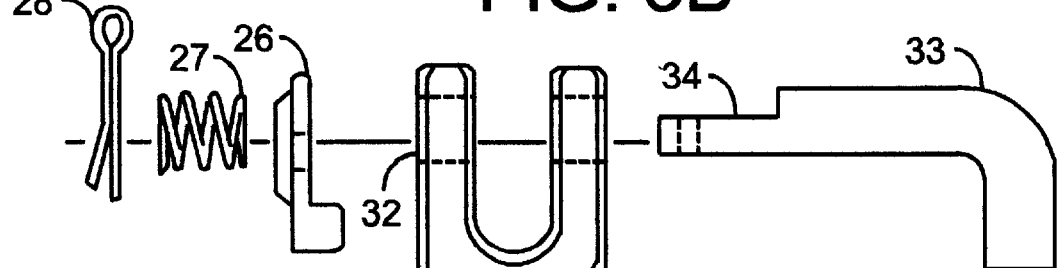
FIG. 3B is an exploded view of FIG. 3A.
Figure 3C:
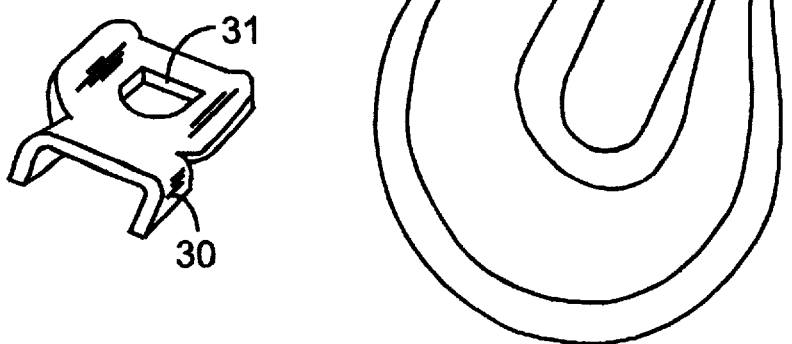

The embodiment depicted in FIGS. 3A and 3B is similar to the embodiment of FIGS. 2A and 2B, but it includes a coil spring 27 placed between cotter pin 28 and spring-lock 29. The spring-lock 29 has flared edges at its lower end 30 facing toward the back side of the clevis of the hook so that it tautly receives the back side 32 of the clevis of the hook. Slot 31 receives the receivable portion 34 of clevis pin 33. It can be seen that the receivable portion 34 of clevis pin 33 penetrating the slot 31 of spring-lock 29 is longer than the receivable portion 25 of L-shaped clevis pin 26 to accommodate the addition of the coil spring. In this embodiment, the spring-lock 29 is pulled away from the hook by the flared edges with the thumb and index finger grabbing the lower end 30 and then turning the spring-lock one-quarter turn.

The invention has been described with reference to certain preferred embodiments. It shall be understood that modifications and variations exist that fall within the spirit and scope of the appended claims. For example, this safety lock can be utilized with any type of hook, not limiting it to grab hooks. Further attachment means other than a cotter pin through a clevis pin may be utilized. The spring-locks may have variations in their shape, and the degree to which they close off the throat of the hook. The flared edges may be of varied shape and a bolt may be substituted for a clevis pin. Nor does the safety lock necessarily require that the clevis portion necessarily require a U-shaped bend. Other modifications, encompassed by the scope of the claims, will be apparent to those of ordinary skill in the art.

I claim:

1. A safety lock for substantially closing a throat of a hook with a clevis at an upper end having two horizontal bore holes therein comprising:

a pin having a shank that has a head on one end and a bore on the opposite end that is substantially perpendicular to a longitudinal direction of the shank;

a spring-lock having an upper portion, middle portion, and lower portion, the upper portion of said spring-lock having a bore in axial alignment with the shank of said pin to receive the shank therethrough, the lower portion of said spring-lock closes the throat of said hook;

said spring-lock at its upper portion being abutted between the head of said pin and the exterior of the clevis of said hook so that the bore of said spring-lock is in axial alignment with the two bore holes in the clevis of said hook;

the shank of said pin penetrating the two bore holes in the clevis of said hook; and restraining means placed through the bore in the shank of said pin after the shank has penetrated the two bore holes in the clevis of said hook to restrain said pin within the two bore holes;

said spring-lock at its middle portion having two flared sides facing toward the head of said pin so that at least one of the two flared sides can be pushed to rotate said spring-lock one-quarter turn around the shaft of said pin and open the throat of said hook.

2. The safety lock of claim 1 wherein said pin is a clevis pin.

3. The safety lock of claim 1 wherein said restraining means is a cotter pin.

4. The safety lock of claim 1 wherein the lower portion of said spring-lock forms a bend at an obtuse angle as measured from the middle portion of said spring-lock.

5. The safety lock of claim 1 having a washer that receives the shank of said pin and is abutted between the restraining means and a back side of the clevis of said hook.

6. The safety lock of claim 1 wherein said hook includes a spring catch portion and the lower end of said spring-lock abuts against the spring catch.

7. The safety lock of claim 1, wherein the lower portion of said spring-lock forms a U-bend shape for closing the throat of the hook.

* * * * *